(12) United States Patent
Shih et al.

(10) Patent No.: US 8,189,051 B2
(45) Date of Patent: May 29, 2012

(54) MOVING OBJECT DETECTION APPARATUS AND METHOD BY USING OPTICAL FLOW ANALYSIS

(75) Inventors: Ming-Yu Shih, Hsinchu (TW); Bwo-Chau Fu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 1245 days.

(21) Appl. No.: 11/933,335

(22) Filed: Oct. 31, 2007

(65) Prior Publication Data

US 2008/0278584 A1    Nov. 13, 2008

(30) Foreign Application Priority Data

May 11, 2007  (TW) ................. 96116934 A

(51) Int. Cl.
*H04N 5/225*  (2006.01)
(52) U.S. Cl. ..................................... 348/169
(58) Field of Classification Search .............. 348/169
See application file for complete search history.

(56) References Cited

U.S. PATENT DOCUMENTS

| | | | | |
|---|---|---|---|---|
| 5,212,547 | A | 5/1993 | Otsuki | 358/105 |
| 5,473,364 | A | 12/1995 | Burt | 348/47 |
| 5,611,000 | A * | 3/1997 | Szeliski et al. | 382/294 |
| 5,862,508 | A | 1/1999 | Nagaya et al. | |
| 5,991,428 | A * | 11/1999 | Taniguchi | 382/107 |
| 6,867,799 | B2 | 3/2005 | Broemmelsiek | 348/169 |
| 6,956,603 | B2 * | 10/2005 | Fujii | 348/169 |
| 7,346,191 | B2 * | 3/2008 | Sano | 382/104 |
| 7,646,887 | B2 * | 1/2010 | Goncalves et al. | 382/103 |
| 7,665,041 | B2 * | 2/2010 | Wilson et al. | 715/860 |
| 2004/0119819 | A1 * | 6/2004 | Aggarwal et al. | 348/143 |
| 2005/0152580 | A1 * | 7/2005 | Furukawa et al. | 382/103 |

FOREIGN PATENT DOCUMENTS

CN    1963867 A1    5/2007

OTHER PUBLICATIONS

A. Talukder and L. Matthies,"Real-time detection of moving objects from moving vehicles using dense stereo and optical flow," IEEE Conference on Intelligent Robots and Systems (IROS), Sendai, Japan, Sep. 2004.
A. Talukder, S. Goldberg, L. Matthies, and A. Ansar, "Real-time detection of moving objects in a dynamic scene from moving robotic vehicles," IEEE Conference on Intelligent Robots and Systems (IROS), Las Vegas, NV, Oct. 2003.
J.-M. Odobez and P. Bouthemy, Robust multiresolution estimation of parametric motion models. *Journal of Visual Communication and Image Representation*, 6(4):348-365, Dec. 1995.
M. J. Black and P. Anandan, The robust estimation of multiple motions: Parametric and piecewise-smooth flow fields, Computer Vision and Image Understanding, CVIU, 63(1), pp. 75-104, Jan. 1996.

* cited by examiner

*Primary Examiner* — Yasin Barqadle
(74) *Attorney, Agent, or Firm* — Lin & Associates IP, Inc.

(57) ABSTRACT

Disclosed is a moving object detection apparatus and method by using optical flow analysis. The apparatus includes four modules of image capturing, image aligning, pixel matching, and moving object detection. Plural images are successively inputted under a camera. Based on neighboring images, frame relationship on the neighboring images is estimated. With the frame relationship, a set of warping parameter is further estimated. Based on the wrapping parameter, the background areas of the neighboring images are aligned to obtain an aligned previous image. After the alignment, a corresponding motion vector for each pixel on the neighboring images is traced. The location in the scene of the moving object can be correctly determined by analyzing all the information generated from the optical flow.

11 Claims, 11 Drawing Sheets

MOVING OBJECT DETECTION APPARATUS AND METHOD BY USING OPTICAL FLOW ANALYSIS

FIELD OF THE INVENTION

The present invention generally relates to a moving object detection apparatus and method by using optical analysis.

BACKGROUND OF THE INVENTION

Moving object detection plays an important role in the automatic surveillance systems. The image surveillance system analyzes the trajectory and behavior of moving objects in the surveillance images to detect the abnormal security events and notifies the security for handling the events.

However, the conventional surveillance system usually sets up a plurality of fixed surveillance cameras in the environment under surveillance. When security event occurs, the conventional system may not provide dynamic security support; therefore, the use of mobile camera is gaining popularity. Nevertheless, the mobile camera may cause the entire image change, which may render the conventional moving object detection techniques inapplicable to the detection of security events.

U.S. Pat. No. 6,867,799 disclosed a method and apparatus for object surveillance with a movable camera. The object surveillance apparatus includes modules for moving object detection, interest object manual selector, determining relative difference between object and camera, predicting future position, and generating moving signals. The feature of the disclosed patent is to construct a system capable of moving the camera, based on the user selected moving object area, so that the moving object stays within the visible image frame.

U.S. Pat. No. 5,991,428 disclosed a moving object detection apparatus and method, able to detect foreground moving object in a mobile camera screen image. The feature of the disclosed patent is to divide the image frame into a plurality of blocks by using template matching, and evaluation and voting mechanism to estimate the displacement vector of the corresponding blocks of the camera images captured by successive time spots. Based on the dominant motion vector of the entire image, an alignment vector between neighboring frame images may be determined. Based on the alignment vector, one of the frame images may be shifted for alignment, and the alignment difference comparison can be performed. The comparison result is analyzed to detect the moving area.

U.S. Pat. No. 5,473,364 disclosed a video technique for indicating moving objects from a movable platform. This technique provides a moving object detection system with a movable platform carrying two cameras or a mobile camera. The locations of the two cameras or the mobile camera must be the same as the direction of the vehicle motion. The feature of the disclosed patent is to store an image captured by the front camera at a time into the memory. When the vehicle moves for a small period of time, an image is captured by the rear camera. After aligning the image stored in the memory, and subtracting the image from the rear camera, a Gaussian pyramid construction is used to compute the area energy and detect the moving object.

In the disclosed patent, the assumption is that the image of the front camera at a previous time and the image of the rear camera at a later time have only small difference. After the alignment, the error between the background of the front camera image and the background of the rear camera image is much smaller than the error of the images captured by a fixed camera at two different times and aligned. Therefore, the subtraction can lead to more stable profile of the moving object.

U.S. Pat. No. 6,710,722 disclosed an image processing device and method for sensing moving objects and rangefinder employing the same. The technology is able to detect moving object from a complicated background. The feature of the disclosed patent is to store a series of camera captured images into the memory. The first several images are averaged to serve as the background image, and then subtracting the current image to obtain the moving object. The patent uses two cameras and a three-dimensional visual technique to compute the distance of the moving object.

In the aforementioned and other moving object detection methods, image alignment and three-dimensional visual optical flow tracing are two of the most common moving object detection methods for movable platforms. As shown in FIG. 1, image alignment is to estimate the two-dimensional alignment parameter of two images, that is, one previous image and one posterior image, and then to align one image, for example the previous image, with the other image, for example the posterior image. By subtracting the two images, the difference is obtained and the moving object is detected. In the image alignment technique, the computation is fast and only one camera is required. However, only the difference in object profile may be obtained from this technique. In addition, the error may occur when the background object in the scene is too close to the camera.

As shown in FIG. 2, the three-dimensional visual optical flow tracing method is to obtain first the optical flow trajectory of the two images, a previous image and a posterior image, and combined with depth information to estimate the platform movement parameter. Based on the platform movement parameter and depth information, the background optical flow trajectory of the background may be estimated. By subtracting the optical flow trajectory of the two images, and obtaining the difference, the moving object may be detected. The three-dimensional visual optical flow tracing technique has a small error, and may be used to obtain solid object. However, the disadvantages may include slow computation, and requiring many cameras to obtain the depth information which is difficult to obtain at smooth images.

SUMMARY OF THE INVENTION

The examples of the present invention may provide a moving object detection apparatus and method by using optical flow analysis. The present invention combines the advantages of image alignment technique and three-dimensional visual optical flow tracing technique. By compensating for the frame image movement caused by camera movement, and combining with motion vector analysis of neighboring frame images, exemplary embodiments of the present invention may provide a moving object detection technique applicable to fixed or movable camera platform.

In one exemplary embodiment, the moving object detection apparatus by using optical flow analysis may include an image capturing module, an image aligning module, a pixel matching module, and a moving object detection module.

Plural images are successively inputted under a camera. Based on neighboring images, frame relationship on the neighboring images is estimated. With the frame relationship, a set of warping parameter is further estimated. Based on the wrapping parameter, the background areas of the neighboring images are aligned to obtain an aligned previous image. After the alignment, a corresponding motion vector for each pixel on the neighboring images is traced. Finally, the location in the scene of the moving object may be correctly determined by analyzing all the information generated from the optical flow.

The disclosed embodiment may detect all the moving objects in the foreground, and may detect the foreground moving object area correctly and stably. This invention may be applied on a movable or a fixed platform with only a single camera, and noise error is difficult to interfere with this invention.

The present invention is applicable to various occasions. For example, the present invention may be constructed on an intelligent security robot to provide dynamic surveillance support for surveillance system. Based on the surveillance area of interest, the security robot may patrol and monitor. When moving object event occurs, the security robot will automatically issue security warning. The present invention may provide the intelligent security robot the capability to detect abnormal moving object.

The foregoing and other features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 1:
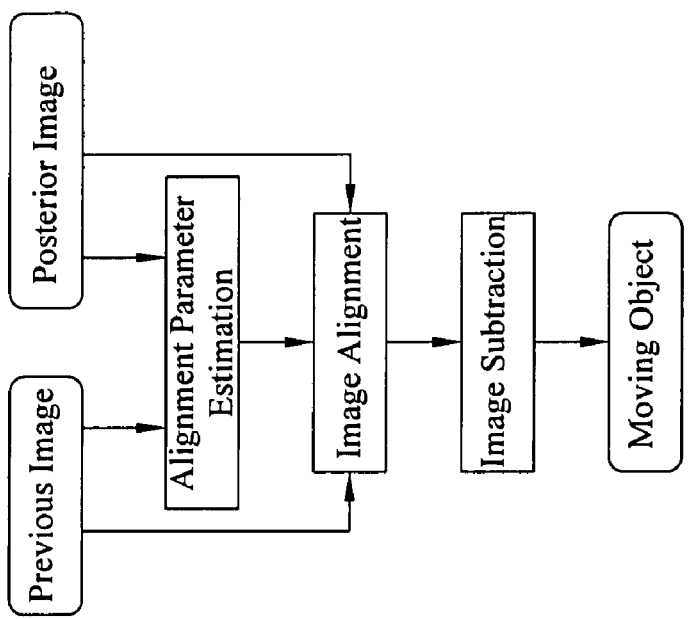
FIG. 1 shows a schematic view of an exemplary image alignment method of conventional moving object detection methods.
Figure 2:
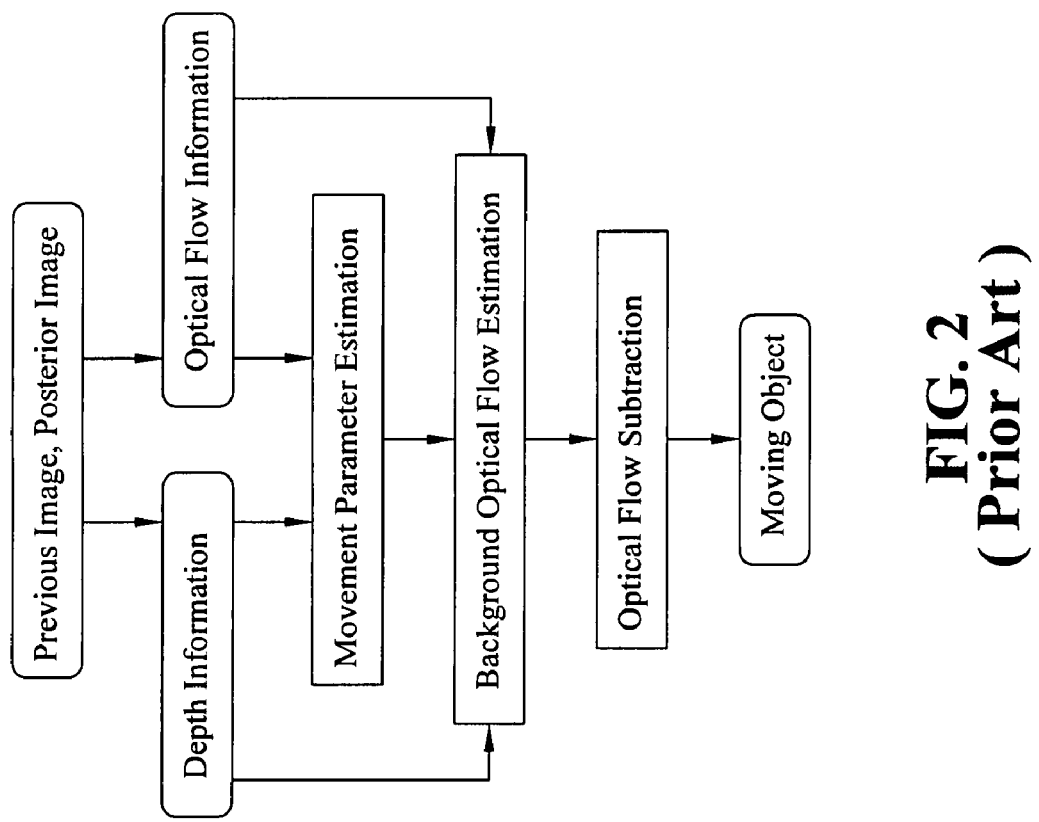
FIG. 2 shows a schematic view of an exemplary three-dimensional visual optical flow tracing method of conventional moving object detection methods.
Figure 3:
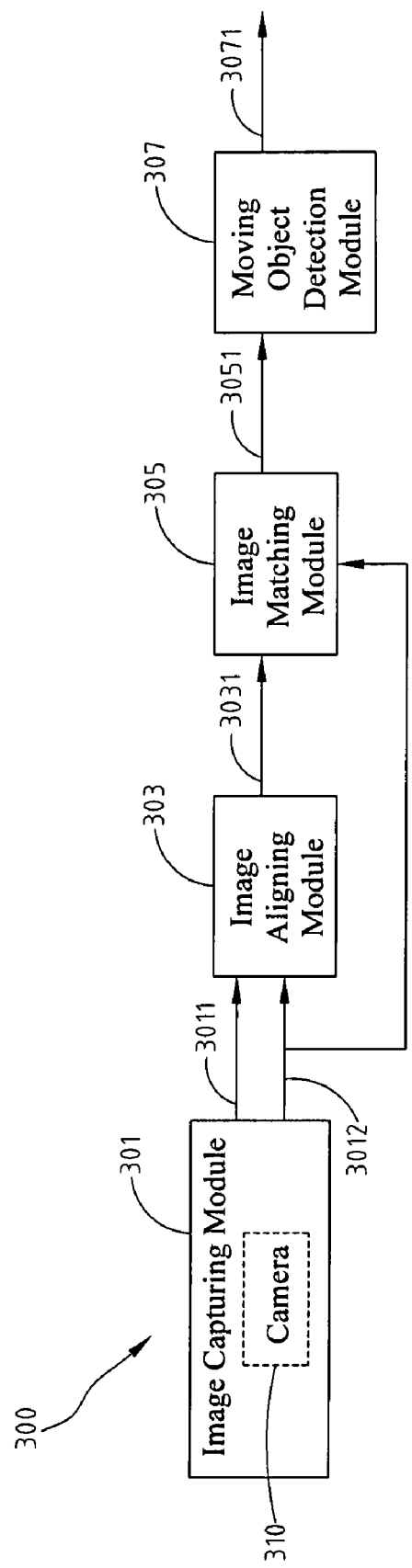
FIG. 3 shows a schematic view of an exemplary moving object detection apparatus by using optical flow analysis, consistent with certain disclosed embodiments.

FIG. 3 shows a schematic view of an exemplary moving object detection apparatus by using optical flow analysis, consistent with certain disclosed embodiments. Referring to the exemplary apparatus, a moving object detection apparatus 300 by using optical flow analysis may include an image capturing module 301, an image aligning module 303, an image matching module 305, and a moving object detection module 307.

Image capturing module 301 successively captures a plurality of images; for example, in a scene under surveillance, a camera 310 moves or remains still to capture a plurality of images. Image capturing module 301 is applied as an input element to moving object detection apparatus 300. Based on a previous image 3011 and a neighboring posterior image 3012, image aligning module 303 obtains an aligned previous image 3031. After the image is aligned, image matching module 305 takes pixel as a unit, and applies optical flow tracing to find the optical flow trajectory of each pixel in posterior image 3012, called corresponding pixel displacement vector 3051. Moving object detection module 307 integrates all corresponding pixel displacement vector 3051 of all pixels in posterior image 3012 to determine a location 3071 of a moving object in the image.

After image capturing module 301 captures each pair of neighboring images (previous image 3011 and posterior image 3012 at two different times), the disclosed embodiment applies image aligning and image matching to accomplish the achievement of using a single camera to execute the moving object detection by movable camera. The realization may be embodied by multi-resolution estimation of parametric motion module and optical flow tracing technique. The following describes image aligning module 303, image matching module 305 and moving object detection module 307 of the disclosed exemplary apparatus.

Figure 4:
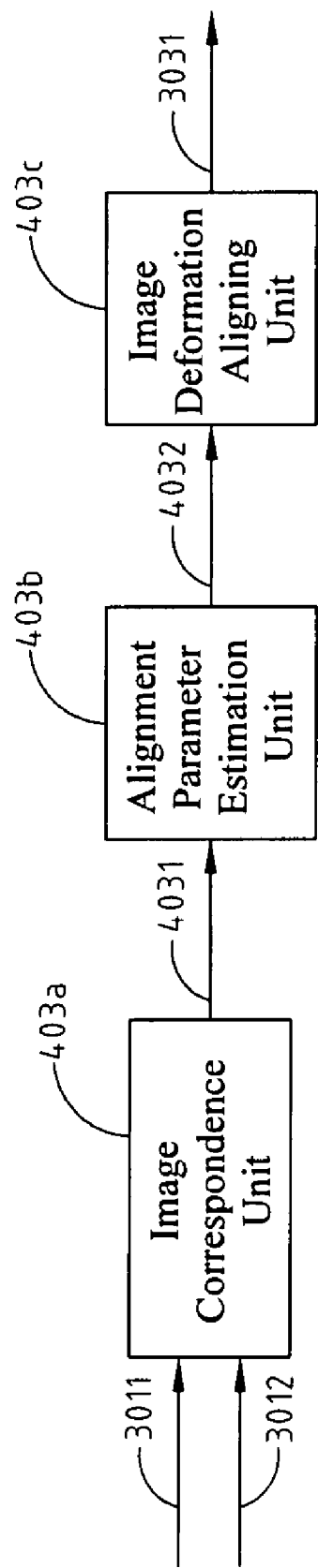
FIG. 4 shows a schematic view of an exemplary image aligning module, consistent with certain disclosed embodiments.

FIG. 4 shows a schematic view of an exemplary image aligning module, consistent with certain disclosed embodiments. Referring to the FIG. 4, image aligning module 303 may be realized with an image correspondence unit 403a, an alignment parameter estimation unit 403b, and an image deformation aligning unit 403c. Based on the two input neighboring images 3011, 3012, image correspondence unit 403a may establish the correspondence relationship between two neighboring images. The correspondence relationship between the two neighboring images describes the image correspondence relationship 4031 of the two neighboring frames. Based on image correspondence relationship 4031 of the two neighboring frames, alignment parameter estimation unit 403b may apply the multi-resolution estimation of parametric motion module to estimate an alignment parameter 4032. An image deformation between the previous and posterior images may be estimated according to alignment parameter 4032. In this manner, the image deformation may have the minimum difference between the two neighboring images. Based on alignment parameter 4032, image deformation aligning unit 403c may apply a transformation matrix to accomplish the image deformation and alignment to obtain an aligned previous image 3031.

Multi-resolution estimation of parametric motion module may include the choice of motion model and the object equation, and optimized resolution estimation. This technique may apply a Gaussian low-pass filter to establish the multi-resolution image pyramid, and apply incremental estimation and coarse-to-fine estimation to approximate the most suitable motion compensation parameter of the neighboring images.

When 2D polynomial motion model is applied, the relation between the image and the motion parameter of the camera may be represented by a matrix. In the matrix representation, the constant, affine, or quadratic motion models may all be applied. The following further applies an affine motion model as an example for explaining the image alignment according to the present invention.

First, a Gaussian low-pass filter is applied to establish a multi-resolution image pyramid. Then, the multi-resolution minimum square root is applied to estimate the image deformation parameter A of the previous and posterior images, wherein A is equal to $[a_1, a_2, \ldots, a_6]$. Based on A, the following equation may be applied to obtain the deformation displacement $(u_i^w, u_i^w)$ of point i of previous image.

$$u_i^w = a_1 + a_2 x_i + a_3 y_i,$$

$$v_i^w = a_4 + a_5 x_i + a_6 y_i,$$

where the matrix A is the transformation matrix determined by the chosen affine motion model, and $(x_i, y_i)$ represents the spatial image position of a point.

Figure 5:
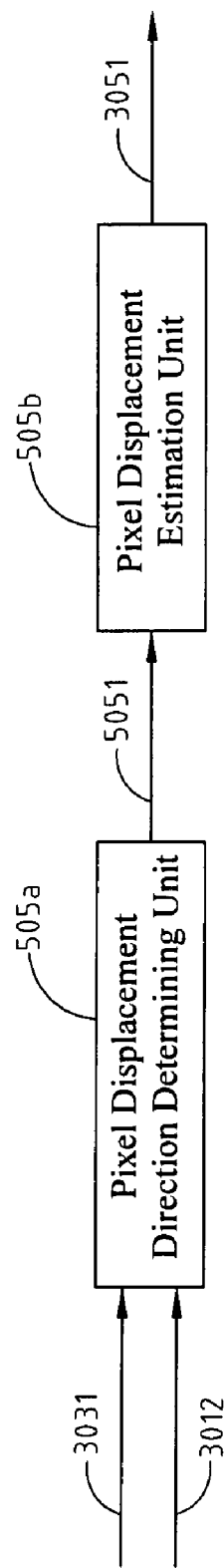
FIG. 5 shows a schematic view of an exemplary image matching module, consistent with certain disclosed embodiments.

FIG. 5 shows a schematic view of an exemplary image matching module 305, consistent with certain disclosed embodiments. Referring to FIG. 5, image matching module 305 may be realized by pixel displacement direction determining unit 505a and pixel displacement estimation unit 505b. When image aligning module 303 obtains aligned previous image 3031, pixel displacement direction determining unit 505a takes pixel as a unit to trace the optical flow in the displacement direction, called pixel displacement direction 5051, of each pixel in two neighboring images based on posterior image 3012 and aligned previous image 3031. Pixel displacement direction 5051 includes the horizontal and vertical directions of the pixel between two neighboring images. Based on each pixel displacement direction 5051, pixel displacement estimation unit 505b estimates the optical flow trajectory displacement of each pixel of the posterior image, i.e., corresponding pixel displacement vector 3051. Corresponding pixel displacement vector 3051 includes the horizontal and vertical moving speeds of the pixel of the posterior image.

In the disclosure, image matching module 305 may apply piecewise optical flow tracing technique to provide the pixel-based image tracing result of neighboring frames. With data conservation and spatial coherence assumption, image matching module 305 may search for the most matching corresponding pixel in the neighboring frame. The exemplary image matching module 305 may apply the pixel-based image tracing result between the neighboring frames in the optical flow tracing technique, and minimizes the following data conservation and spatial coherence equations to obtain the optical flow trajectory displacement of each pixel of the posterior image. The following describes the data conservation and spatial coherence assumptions.

The data conservation assumption means that the pixel value of the coordinates (x,y) of the image at time t should be the same as the pixel value of the coordinates (x+dx, y+dy) of the image at time t+1. This is also called brightness constancy assumption. This assumption may be defined as follows:

$$I(x,y,t) = I(x+u\delta t, y+v\delta t, t+\delta t)$$

where (u,v) represents the horizontal and vertical moving speed of the image, $\delta t$ is a very small period of time. The most straightforward way to apply the brightness constancy assumption may use the sum-of-squared differences (SSD) equation. In other words, the assumption is that in a very small period of time $\delta t$, the image brightness change in the nearby area of each pixel approximates a constant. The coarse horizontal and vertical moving speeds of the pixel may be obtained by minimizing the following equation:

$$E_D(u,v) = \sum_{(x,y) \in R} [I(x,y,t) - I(x+u\delta t, y+v\delta t, t+\delta t)]^2$$

The spatial coherence assumption means that the nearby area of each pixel belongs to the same surface. Under this assumption, the area image change on a smooth rigid object is small. Therefore, the execution of this assumption may be accomplished through the application of smooth constraint on the optical flow change of the nearby area. This assumption may be defined as follows:

$$E_s(u,v) = u_x^2 + u_y^2 + v_x^2 + v_y^2$$

Through the equation of $E(u,v) = E_D(u,v) + \lambda E_S(u,v)$, the use of data conservation and spatial coherence assumptions, using $\lambda$ to define the weight ratio of the two assumptions, and minimizing algorithm, the correct horizontal and vertical moving speeds of each pixel may be approximated.

Figure 6:
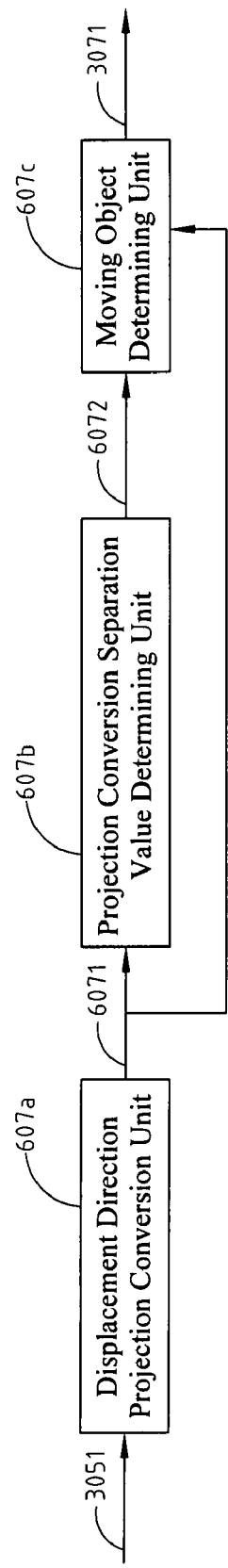
FIG. 6 shows a schematic view of an exemplary moving object detection module, consistent with certain disclosed embodiments.

FIG. 6 shows a schematic view of an exemplary moving object detection module 307, consistent with certain disclosed embodiments. Referring to FIG. 6, moving object detection module 307 may be realized with displacement direction projection conversion unit 607a, projection conversion separation value determining unit 607b, and moving object determining unit 607c. After image matching module 305 obtains corresponding pixel displacement vector 3051 of each pixel of the posterior image, displacement direction projection conversion unit 607a may apply corresponding pixel displacement vector 3051 to compute displacement vector conversion value 6071 of each pixel of the posterior image. Based on displacement vector conversion value 6071, projection conversion separation value determining unit 607b may compute the standard deviation $\sigma$ to determine projection separation value 6072 for each pixel of the posterior image. Based on projection separation value 6072, for each pixel of the posterior image, moving object determining unit 607c may mark location 3071 of the moving object within the image frame. The area formed by the location of the marked moving object within the frame is the detected moving objects.

In the disclosure, displacement direction projection conversion unit 607a may first compute the optical flow distance $d_i = \sqrt{(u_i^o)^2 + (v_i^o)^2}$ of pixel i, then applies the semi-Gaussian model to describe the optical flow distance of all pixels of the image, i.e., displacement vector conversion value 6071, and finally obtains the standard deviation $\sigma$. Moving object detection module 307 may apply the following equation to detect the moving object $o_i$.

$$o_i = \begin{cases} 1 & \text{if } d_i > 1.15\sigma \text{ and } d_i > d_{min} \\ 0 & \text{otherwise} \end{cases}$$

where $d_{min}$ is the minimum motion vector, and may be obtained from experiments.

In summary of the above description, the present disclosure may first analyze the neighboring frames to obtain the compensation parameters to recover the background change caused by the camera movement. Then, the present disclosure may trace the corresponding pixel shift within the compensated, i.e., aligned, neighboring frames. In tracing the corresponding pixels, the present disclosure may combine the information generated by optical flow tracing to mark the moving area. Finally, the present disclosure may eliminate the minor noise signals to detect the area in which the moving object occurs.

Because the pixels of the aligned previous image and the posterior image are compared and traced, the present invention may be able to mark all the entire area of the moving object. Also, as only the really moving object area can cause the large area movement, it is easy to distinguish the noise signals in the un-aligned frame. Therefore, it is not necessary to use two cameras to reduce the error. In short, it is easy to install as well as reduce the cost of installation. The present invention is applicable to both fixed and mobile camera platform for moving object detection. In other words, the present invention may be used for moving object detection whether the camera moves or remains stationary.

Figure 7:
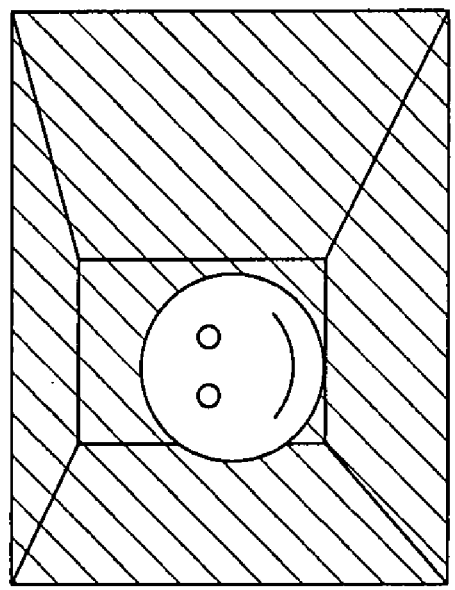
FIG. 7 shows an exemplary schematic view of using an affine motion model to estimate the deformation parameter between previous image and posterior image on the condition of a moving camera, consistent with certain disclosed embodiments.
Figure 7:
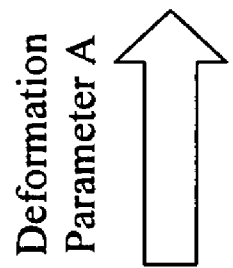
Figure 7:
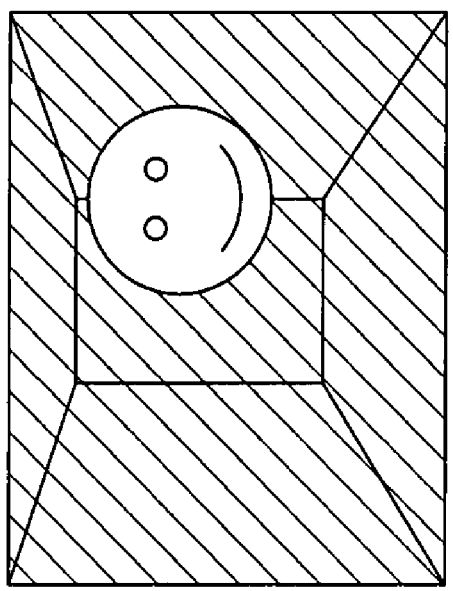

FIGS. 7-11 describe an exemplary actual application of the disclosed embodiments on the condition of a moving camera. FIG. 7 shows an exemplary schematic view of using an affine motion model to estimate the deformation parameter A between previous image and posterior image on the condition of a moving camera, consistent with certain disclosed embodiments. In FIG. 7, the left figure and the right figure are the previous and posterior schematic images respectively captured by a moving camera. The shaded area with the slanted lines is the background. The smiling face indicates the foreground moving object. As the camera moves, foreground and the background in the images both move. Therefore, the smiling face in the previous image appears on the upper right-hand side of the smiling face in the posterior image, and the rectangle of the background in the previous image appears on the right-hand side of the rectangle of the background in the posterior image. The aligning of the previous and posterior images may be performed through the use of deformation parameter A.

Figure 8:
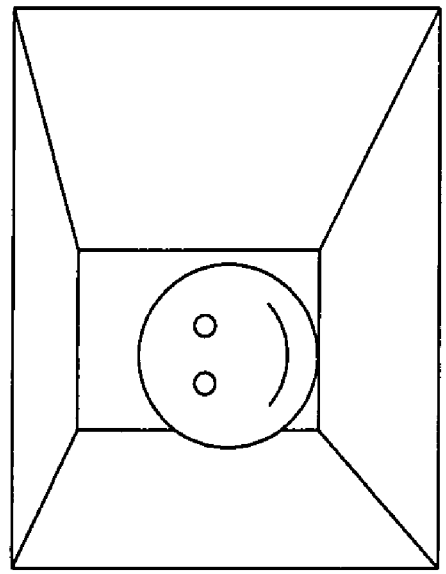
FIG. 8 shows an exemplary schematic view of using the deformation parameter of FIG. 7 to align the background of the previous image and the posterior image, consistent with certain disclosed embodiments.
Figure 8:
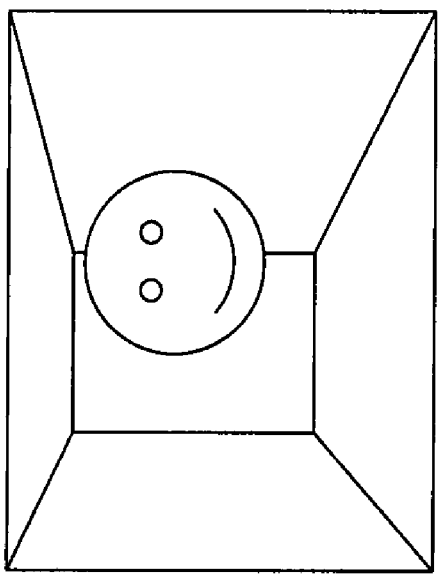

FIG. 8 shows an exemplary schematic view of using the deformation parameter A obtained in FIG. 7 to align the backgrounds of previous and posterior images, consistent with certain disclosed embodiments. After image aligning module 303 accomplishes the alignment, it may be seen that the rectangle in the background is now aligned in both the previous and the posterior frames. Hence, the images captured at different locations by a moving camera now have the common background as image base.

Figure 9:
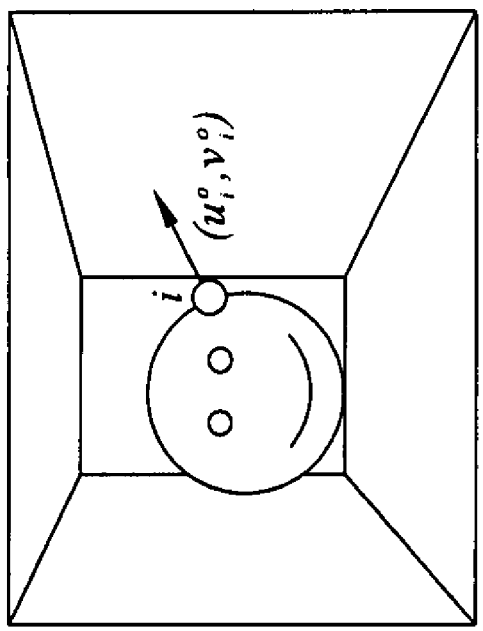
FIG. 9 shows an exemplary schematic view of using optical flow tracing on the aligned previous and posterior images, consistent with certain disclosed embodiments.
Figure 9:
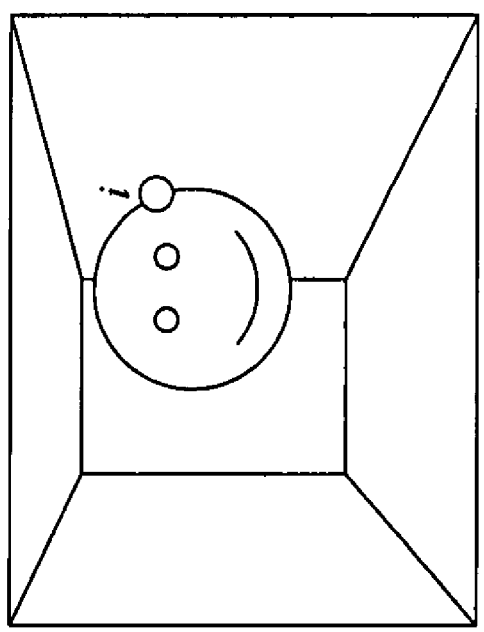

FIG. 9 shows an exemplary schematic view of performing optical flow tracing on aligned previous and posterior images of FIG. 8, consistent with certain disclosed embodiments. The optical flow tracing on any pixel in the frame will result in a vector in x-axis and a vector in y-axis, shown as the arrow in the right figure of FIG. 9. Hence, it is possible to locate the unaligned area in neighboring frames which is caused by movement of the foreground. This will mark the moving object area.

Figure 10:
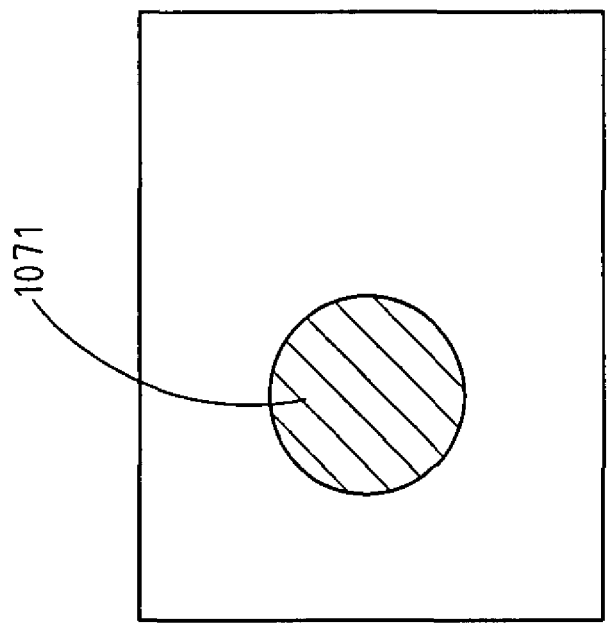
FIG. 10 shows an exemplary schematic view of detecting moving object, consistent with certain disclosed embodiments.
Figure 10:
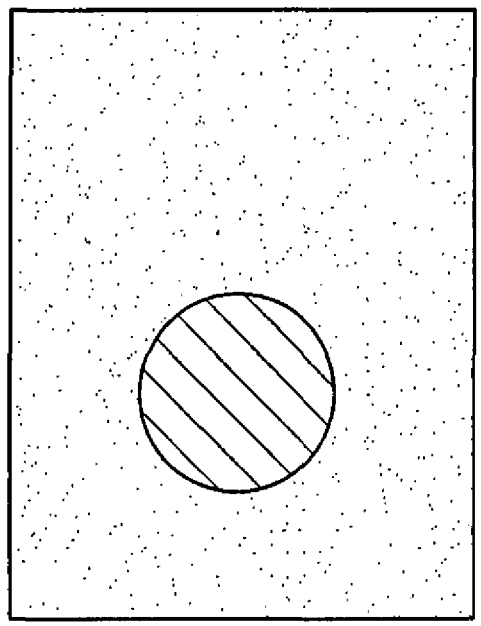

FIG. 10 is an exemplary schematic view of detecting moving object, consistent with certain disclosed embodiments. The left figure of FIG. 10 is the optical flow trajectory displacement obtained after the computation of image matching module 305, where the shaded area with the slanted lines is the optical flow tracing area with large displacement, and the remaining is the optical flow tracing area with small displacement. The reference number 1071 in the right figure indicates an exemplary foreground moving object area separated by moving object detection module 307.

Figure 11:
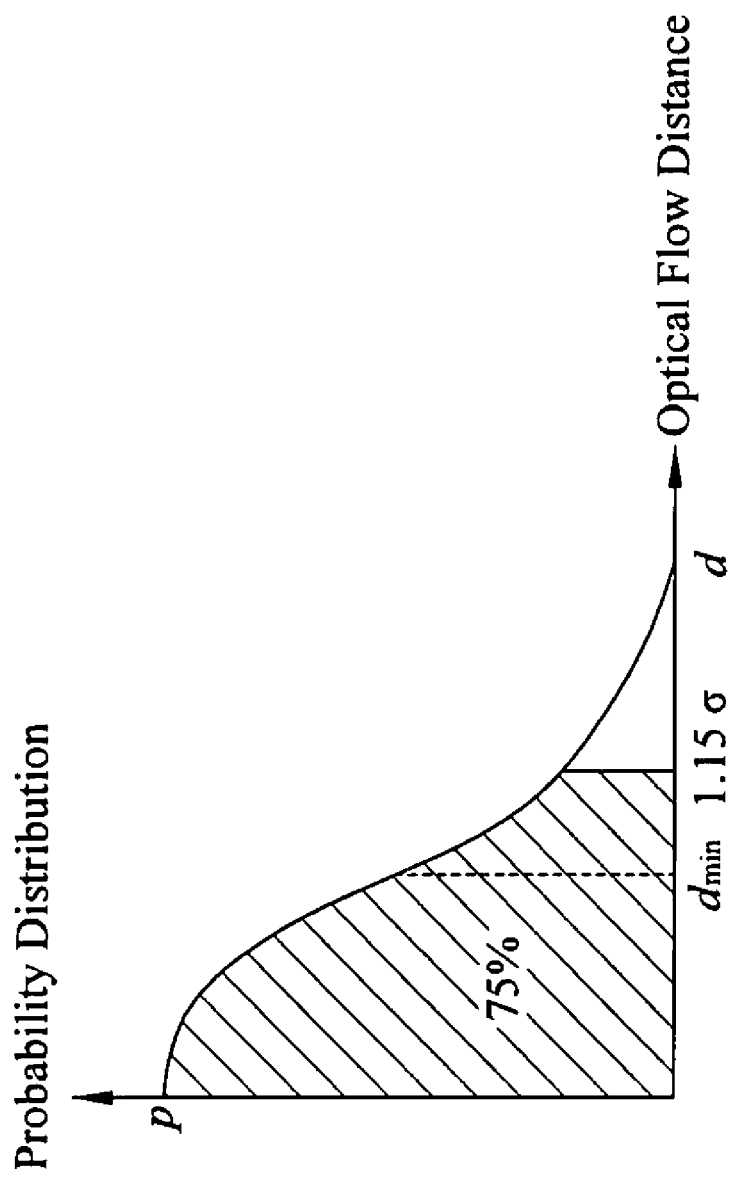
FIG. 11 shows an exemplary equation used to detect the moving object of FIG. 10, consistent with certain disclosed embodiments.

FIG. 11 shows an exemplary equation used to detect the moving object consistent with certain disclosed embodiments. The y-axis p represents the probability distribution of the Gaussian model, and x-axis d represents the optical flow tracing distance of the pixel of the image, with $d_{min}$ as the default minimum displacement vector.

It may be shown in FIGS. 7-11 that the exemplary moving object detection apparatus and method by using optical flow analysis according to the present invention may be viable and provide stable results.

The architecture disclosed in the present invention is also applicable to the future smart car design so that the future smart car may automatically detect the moving pedestrian or objects within the visible distance to reduce the damage caused by human error. In addition, the present invention is also applicable to the elimination of image vibration occurs in outdoor camera. As the present invention is not affected by vibration, the resulted surveillance image may be obtained, and the moving object detection function is stable and correct.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A moving object detection apparatus using optical flow analysis, comprising:
    an image capturing module for successively capturing a plurality of images;
    an image aligning module for obtaining an aligned previous image for each pair of neighboring images of said plurality of images, said pair of neighboring images consisting of a previous image and a posterior image;
    an image matching module for taking a pixel as a unit and obtaining a corresponding pixel displacement vector for each pixel of said previous image and said posterior image through optical flow tracing; and
    a moving object detection module for combining all the corresponding pixel displacement vectors of all the pixels in said posterior image to determine a location of said moving object within an image frame;
    wherein said moving object detection module includes:
        a displacement direction projection conversion unit for obtaining a displacement vector conversion value for each pixel of said posterior image according to said corresponding pixel displacement vector;
        a projection conversion separation value determining unit, based on said displacement vector conversion value of each pixel of said posterior image, for obtaining standard deviation of the displacement vector conversion values of all pixels of said posterior image in order to determine a projection separation value for each pixel of said posterior image; and
        a moving object determining unit for marking the location of said moving object within said image frame according to said projection separation value for each pixel of posterior image.

2. The apparatus as claimed in claim 1, wherein said image aligning module at least includes:
    an image correspondence unit for establishing a correspondence relationship between two neighboring image frames according to each said pair of neighboring images;
    an alignment parameter estimation unit for estimating an alignment parameter according to said correspondence relationship between each said pair of neighboring images; and an image deformation aligning module for obtaining said aligned previous image according to said alignment parameter.

3. The apparatus as claimed in claim 1, wherein said image matching module at least includes:
   a pixel displacement direction determining unit for determining a displacement direction of each pixel of each said pair of neighboring images through optical flow tracing; and
   a pixel displacement estimation unit, for estimating said corresponding pixel displacement vector of each pixel of said posterior image.

4. The apparatus as claimed in claim 1, wherein said previous image and said posterior image are images captured at different time points.

5. The apparatus as claimed in claim 1, wherein said image capturing module has a camera for successively capturing a plurality of images.

6. The apparatus as claimed in claim 1, wherein said corresponding pixel displacement vector of each pixel of said posterior image is an optical flow displacement of each pixel of said posterior image.

7. The apparatus as claimed in claim 5, wherein said camera is moving or stays stationary.

8. A moving object detection method using optical flow analysis, said method comprising the following steps of:
   successively capturing a plurality of images;
   estimating an alignment parameter from each pair of neighboring images of said plurality of images, said pair of neighboring images consisting of a previous image and a posterior image;
   based on said alignment parameter, aligning background of each said pair of neighboring images;
   taking a pixel as a unit, through optical flow tracing on each said pair of neighboring images after alignment to obtain a corresponding pixel displacement vector of each pixel of said posterior image; and
   combining the corresponding pixel displacement vectors of all pixels of said posterior image to determine a location of said moving object within an image frame;
   wherein determining the location of said moving object further includes the steps of:
      obtaining a displacement vector conversion value for each pixel of said posterior image according to said corresponding pixel displacement vector;
      obtaining standard deviation of the displacement vector conversion values of all pixels of said posterior image based on said displacement vector conversion value of each pixel of said posterior image in order to determine a projection separation value for each pixel of said posterior image; and
      marking the location of said moving object within said image frame according to said projection separation value for each pixel of said posterior image.

9. The method as claimed in claim 8, wherein said alignment parameter is obtained by establishing a correspondence relationship between each said pair of neighboring images, and then estimating said alignment parameter based on said correspondence relationship of said pair of neighboring images.

10. The method as claimed in claim 8, wherein said optical flow tracing is accomplished using a piecewise optical flow tracing technique to provide a pixel-based tracing result of said pair of neighboring images and obtain an optical flow displacement of each pixel of said posterior image.

11. The method as claimed in claim 8, wherein said displacement vector conversion value is obtained through analysis of an optical distance of each pixel of an image.

* * * * *

UNITED STATES PATENT AND TRADEMARK OFFICE
CERTIFICATE OF CORRECTION

PATENT NO.      : 8,189,051 B2
APPLICATION NO. : 11/933335
DATED           : May 29, 2012
INVENTOR(S)     : Ming-Yu Shih et al.

Page 1 of 1

It is certified that error appears in the above-identified patent and that said Letters Patent is hereby corrected as shown below:

On the Title Page, Item (75), change "Ming-Yu Shih, Hsinchu (TW)" to
--Ming-Yu Shih, Taoyuan (TW)--

Signed and Sealed this
Twenty-fourth Day of July, 2012

David J. Kappos
*Director of the United States Patent and Trademark Office*